May 9, 1950      J. P. MANTOS      2,507,032
FOOT MEASURING DEVICE
Filed March 2, 1948      3 Sheets-Sheet 1
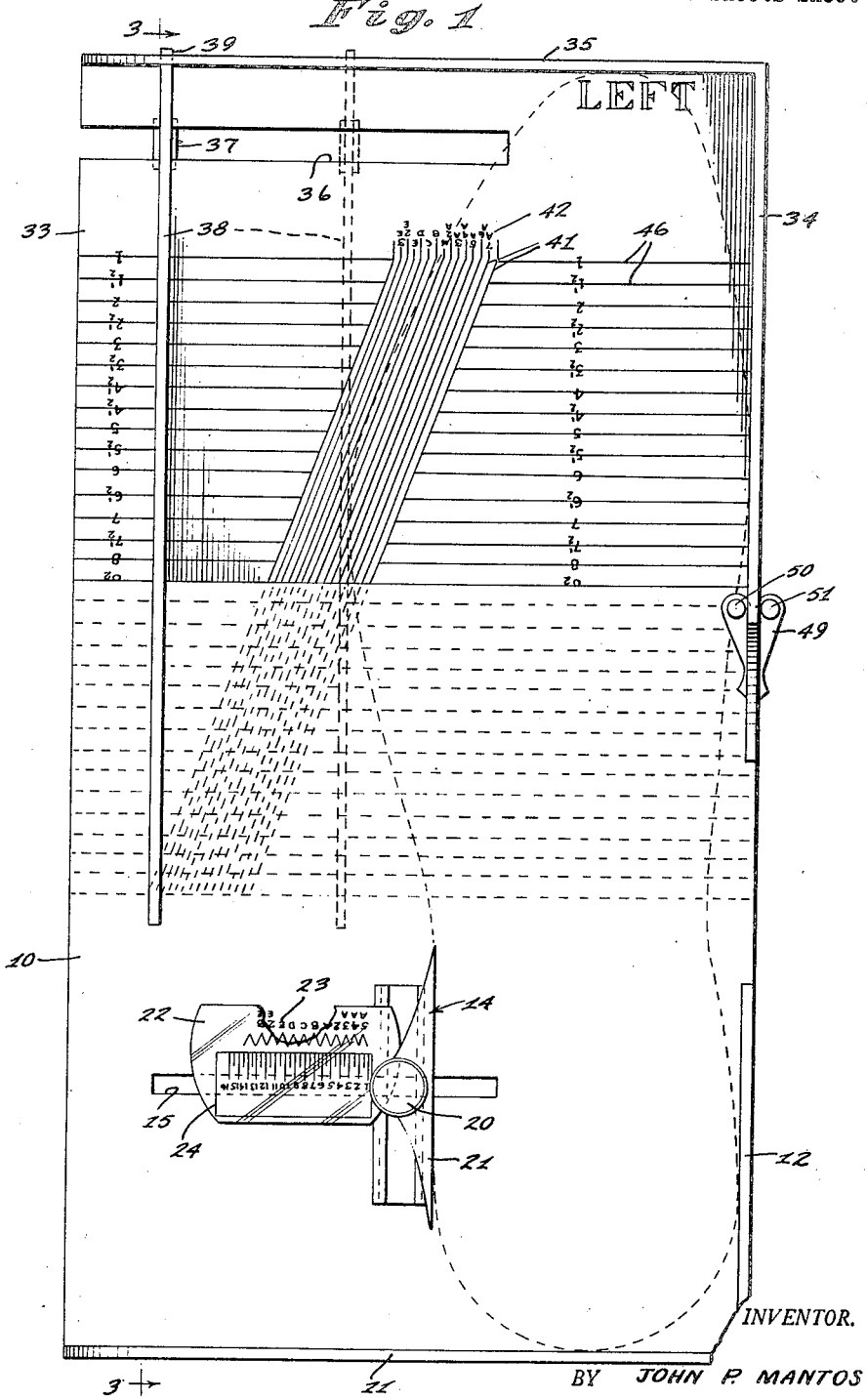
INVENTOR.
BY JOHN P. MANTOS
McMorrow, Berman & Davidson
ATTORNEYS

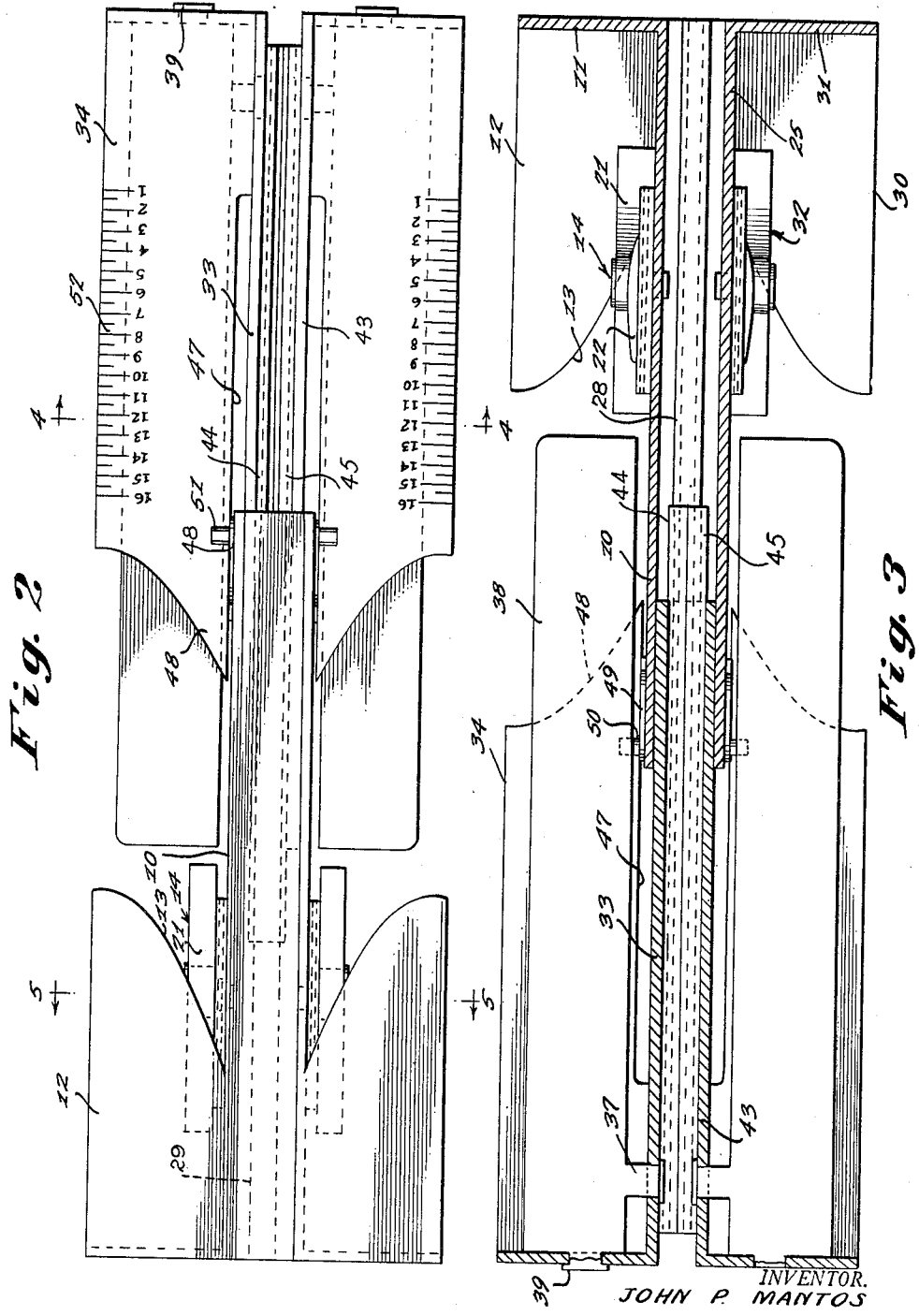

May 9, 1950     J. P. MANTOS     2,507,032
FOOT MEASURING DEVICE
Filed March 2, 1948     3 Sheets-Sheet 3

INVENTOR.
JOHN P. MANTOS
BY
McMorrow, Berman + Davidson
ATTORNEYS

Patented May 9, 1950

2,507,032

UNITED STATES PATENT OFFICE 2,507,032

FOOT MEASURING DEVICE

John P. Mantos, Boston, Mass.

Application March 2, 1948, Serial No. 12,612

4 Claims. (Cl. 33—3)

This invention relates to a device for measuring the size of a person's foot quickly and accurately.

An object of the invention is to provide such a device adapted to measure accurately both foot length as well as the widths of the heel and ball portions of the foot.

Another object is to provide such a device comprising a pair of units connected in oppositely displaced relation with one another and together constituting a unitary instrument, one unit being adapted for the measurement of one foot of a person and the other unit for the other foot.

Another object is the provision of means of the kind described of simple construction and adapted for efficient, low cost manufacture.

Figure 4:
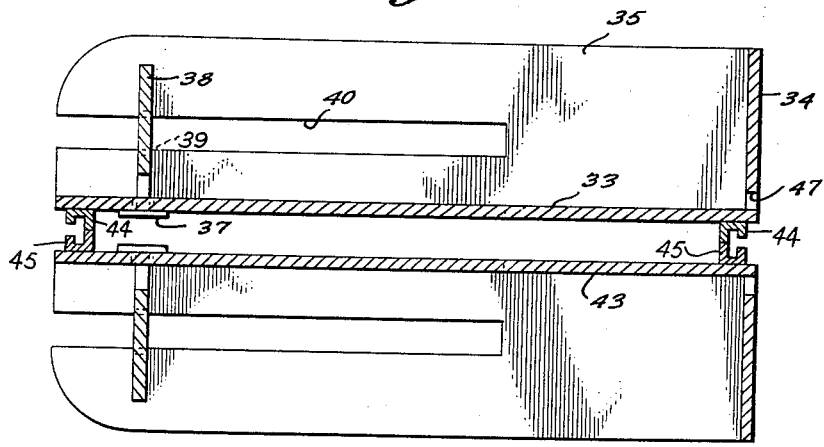
Figure 5:
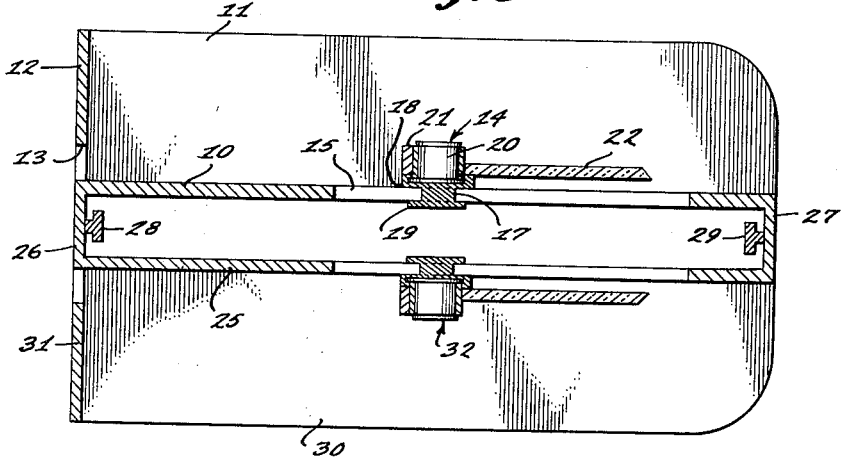
Figure 6:
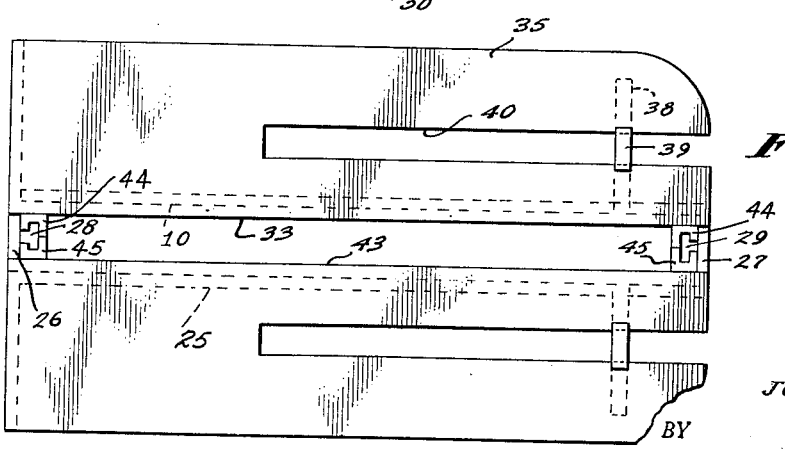

These and other objects are attained by the means described herein and illustrated in the accompanying drawings, in which:

Figure 1 is a top plan view of the invention,

Figure 2 is a side elevational view thereof as seen from the right hand side of Figure 1, Figure 3 is a cross-sectional view on the line 3—3 of Figure 1, Figure 4 is a cross-sectional view on the line 4—4 of Figure 2, Figure 5 is a cross-sectional view on the line 5—5 of Figure 2, Figure 6 is a front end view of the foot measuring device of the present invention.

With detailed reference to the drawings, the device as seen in Figure 1 is adapted for measuring the left foot of a person and comprises a heel plate 10 which may be of rectangular outline and provided at one end with a heel-contacting flange 11 and a lateral flange 12 for contacting the inner side of the rear portion of a left foot positioned on the plate as indicated in dotted lines. The flange 12, in its forward portion, is preferably of the undercut formation seen at 13 in Figure 2.

A heel-measuring unit 14 is mounted on the heel plate (see Figures 1 and 5) and adapted for adjustable movement in a transverse slot 15 provided in said plate. The unit comprises a lug 17 extending through the slot 15 and having a top flange 18 and a bottom flange 19 lying against the top and bottom faces of plate 10 whereby the lug is retained in the slot. The top flange 18 has secured thereto a pivot stud 20 on which is pivotally mounted contact member 21, adapted to be disposed against the outer side of the rear portion of a person's left foot. The stud likewise supports, according to the preferred construction, a magnifying glass 22 for facilitating the reading of heel width measuring indicia of which one set 23 is positioned on plate 10 adjacent the slot 15, and the other set 24 may be disposed on the under face of the magnifying glass.

The heel plate 10 for the left foot is secured at its under side to a similar heel plate 25 (Figure 5) for the right foot. The device is, of course, reversed when the latter plate is to be used, as will further appear. The two plates, with their under faces disposed in spaced apart adjacency, are connected by lateral integral webs 26 and 27, each of which has secured to its inner surface a T-strip, 28 and 29, respectively, whereby toe plates are slidably associated with heel plates, as will also be further described. The right heel plate 25, similarly to the left heel plate, has rear and lateral flanges 30 and 31, and a heel measuring unit 32, similar in all respects to those already described, the details of which need, therefore, not be repeated. Each heel plate has a toe plate associated therewith, likewise identical in detail, the elaboration of one of which (the left) will suffice for both.

As seen in Figure 1, initially, a left toe plate 33 is associated with the forward portion of heel plate 10 in underlying relation therewith. Plate 33 is provided with a lateral flange 34 (Figures 1 and 4) for contacting the inner side of a left foot positioned on the plate and with a toe contacting flange 35 at the forward edge of the plate. A transverse slot 36 in plate 33 is adapted to receive the slidable retaining lug 37 of a movable contact strip 38, the end of which also is provided with a retaining lug 39 projecting into a slot 40 formed in the toe flange 35. The strip is held by said lugs in longitudinally extending relation with toe plate 33 and with a substantial portion of heel plate 10, and is spaced thereabove so as to be movable transversely of said plates.

Contact strip 38 is adapted to be moved into contact against the outer side of the front or ball portion of a left foot disposed on said two plates, for measuring the width of that area of the foot. For this purpose, the top surface of plate 33 is provided with width indicating indicia to be co-related with the position of the strip 38 in the measuring procedure. This indicia comprises diagonally extending lines 41 for showing foot widths, as indicated at 42. When strip 38 is in contact with a foot, the diagonal line 41 jointly intersected by the inside surface of strip 38 and the free front edge of heel plate 10, designates the width of the foot. Thus, as indicated in broken lines, Figure 1, the width of the foot outlined is 5A.

Left toe plate 33 and a right toe plate 43 are independently slidable relative to each other and to the heel plates by means of channel strips 44 and 45 (Figure 4) which respectively slidably embrace opposite channels of the T strips 28 and 29 (Figure 6) associated with the heel plates, as already described. The toe plates are thus independently adjustable forwardly and rearwardly of the front portions of the heel plates. On the toe plates, as will be noted for the left foot plate in Figure 1, transverse lines 46 and associated indicia indicate the length of a foot after the toe contact flange 35 has been moved into contact with the forward extremity of a positioned foot. The length of the foot is determined by the position of the front edge of heel plate 10 relative to said transverse indicia 46.

In order to preclude interference of the lateral flange 34 with the heel plate 10 when the two plates are moved toward one another, said flange is longitudinally slotted in its lower portion, as indicated at 47 for clearing the heel plate (see Figures 3 and 4). Endwise interference of lateral flanges 12 and 34 of said two plates is avoided (and a greater overlap thereof made possible) by forming the inner end of flange 34 with a tapering lower part 48 receivable in the undercut 13 of the heel plate 10. For stabilizing the heel and toe plates relative to one another, the former (as seen in Figures 1, 2 and 3) has secured thereto at one side a small plate 49 having a pair of studs 50 and 51 thereon, spaced apart a distance slightly greater than the thickness of lateral flange 34 and adapted to frictionally engage the sides thereof when said flange moves inwardly of heel plate 10.

The lateral flange 34 may be provided with arch indicating indicia 52 (Figure 2) which, in the movement of the toe plate, assume positions laterally of the foot being measured.

Right toe plate 43, as will be understood is formed in all details similarly to the left toe plate already described.

It will be noted at the bottom of Figures 2 and 3, that the longitudinal edges of the lateral and end flanges of the heel and toe plates are in a common plane so that the device rests upon one set of said commonly disposed edges when the opposite foot measuring unit is being employed.

Modifications are readily suggested by the means herein disclosed but these are believed to be comprised within the spirit and scope of the invention.

What is claimed is:

1. A reversible foot-measuring device, comprising a pair of like heel plates, laterally-spaced vertical webs integral with said heel plates and connecting the same together in vertically-spaced parallel relation to provide a reversible tubular heel support, each heel plate having an end and a side heel-engaging flange integral therewith, said end and side flanges being vertically aligned and extending vertically from their respective heel plates in opposite directions, a pair of toe plates, means mounting said toe plates for individual telescopic sliding movement relative to said tubular heel support, each toe plate having an integral toe-end-engaging and foot-side-engaging flange extending vertically therefrom in opposite directions with said foot-side-engaging flanges vertically aligned, and all of said flanges being of the same height whereby to provide supports for supporting said heel and toe plates horizontally when either set of flanges is disposed downwardly.

2. A reversible foot-measuring device, comprising a pair of like heel plates, laterally-spaced vertical webs integral with said heel plates and connecting the same together in vertically-spaced parallel relation to provide a reversible tubular heel support, each heel plate having an end and a side heel-engaging flange integral therewith, said end and side flanges being vertically aligned and extending vertically from their respective heel plates in opposite directions, a pair of toe plates, means mounting said toe plates for individual telescopic sliding movement relative to said tubular heel support inwardly of said plates and webs thereof, each toe plate having an integral toe-end-engaging and foot-side-engaging flange extending vertically therefrom in opposite directions with said foot-side-engaging flanges vertically aligned, all of said flanges being of the same height whereby to provide supports for supporting said heel and toe plates horizontally when either set of flanges is disposed downwardly, said side flanges of said heel plate being longitudinally aligned with corresponding foot-side-engaging flanges of said toe plates, each corresponding side and foot-side-engaging flange having meeting end edges formed to interfit in partially overlapping relation, and said foot-side-engaging flanges being formed with slots receiving said heel plates therein.

3. A reversible foot-measuring device, comprising a pair of like heel plates, laterally-spaced vertical webs integral with said heel plates and connecting the same together in vertically-spaced parallel relation to provide a reversible tubular heel support, each heel plate having an end and a side heel-engaging flange integral therewith, said end and side flanges being vertically aligned and extending vertically from their respective heel plates in opposite directions, a pair of toe plates, each web having a laterally-inwardly-directed T-strip secured thereto intermediate said heel plates, said T-strips each providing a pair of vertically-spaced and aligned slideways inwardly of each web, each toe plate having a pair of laterally-spaced channel strips fixed thereto and extending longitudinally of the same inwardly thereof, said channel strips being slidable in said slideways provided by said T-strips whereby to provide means mounting said toe plates for individual telescopic sliding movement relative to said tubular heel support inwardly of said plates and webs thereof, each toe plate having an integral toe-end-engaging and foot-side-engaging flange extending vertically therefrom in opposite directions with said foot-side-engaging flanges vertically aligned, and all of said flanges being of the same height whereby to provide supports for supporting said heel and toe plates horizontally when either set of flanges is disposed downwardly.

4. A reversible foot-measuring device, comprising a pair of like heel plates, laterally-spaced vertical webs integral with said heel plates and connecting the same together in vertically-spaced parallel relation to provide a reversible tubular heel support, each heel plate having an end and a side heel-engaging flange integral therewith, said end and side flanges being vertically aligned and extending vertically from their respective heel plates in opposite directions, a pair of toe plates, each web having a laterally-inwardly-directed T-strip secured thereto intermediate said heel plates, said T-strips each providing a pair of vertically-spaced and aligned slideways inwardly of each web, each toe plate having a pair of laterally-spaced channel strips fixed thereto and extending longitudinally of the same inwardly thereof, said channel strips being slidable in said slideways provided by said T-strips whereby to provide means mounting said toe plates for individual telescopic sliding movement relative to said tubular heel support inwardly of said plates and webs thereof, each toe plate having an integral toe-end-engaging and foot-side-engaging flange extending vertically therefrom in opposite directions with said foot-side-engaging flanges vertically aligned, all of said flanges being of the same height whereby to provide supports for supporting said heel and toe plates horizontally when either set of flanges is disposed downwardly, said side flanges of said heel plates being longitudinally aligned with corresponding foot-side-engaging flanges of said toe plates, each corresponding side and foot-side-engaging flange having meeting end edges formed to interfit in partially overlapping relation, and said foot-side-engaging flanges being formed with slots receiving said heel plates therein.

JOHN P. MANTOS.

REFERENCES CITED

The following references are of record in the file of this patent:

UNITED STATES PATENTS

| Number | Name | Date |
| --- | --- | --- |
| 1,137,233 | Rush | Apr. 27, 1915 |
| 1,582,636 | Clarke | Apr. 27, 1926 |
| 2,175,116 | Hack | Oct. 3, 1939 |

FOREIGN PATENTS

| Number | Country | Date |
| --- | --- | --- |
| 317,888 | Great Britain | Aug. 26, 1929 |
| 329,581 | Germany | Nov. 29, 1920 |